Feb. 24, 1970  J. BUSCHMAN  3,497,336
BELT SANDER
Filed Nov. 1, 1967  2 Sheets-Sheet 1
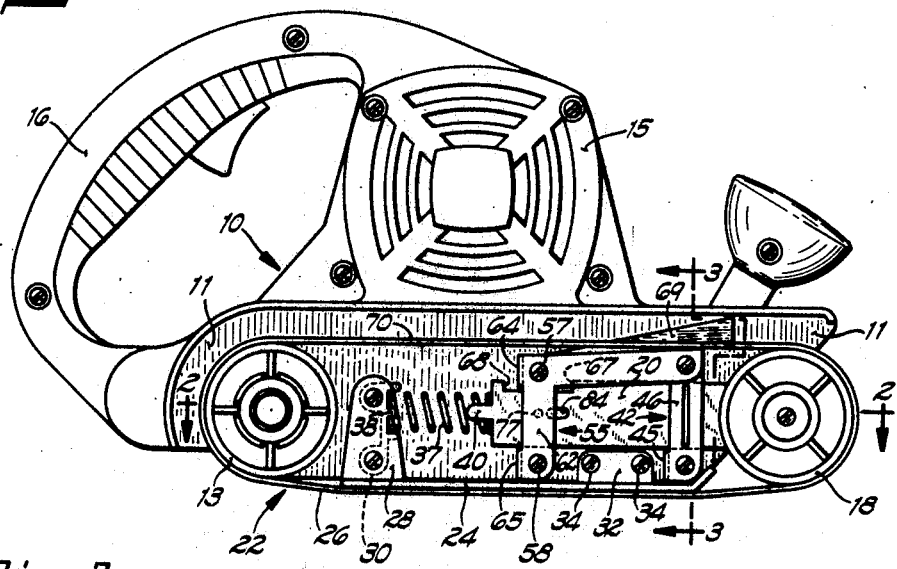
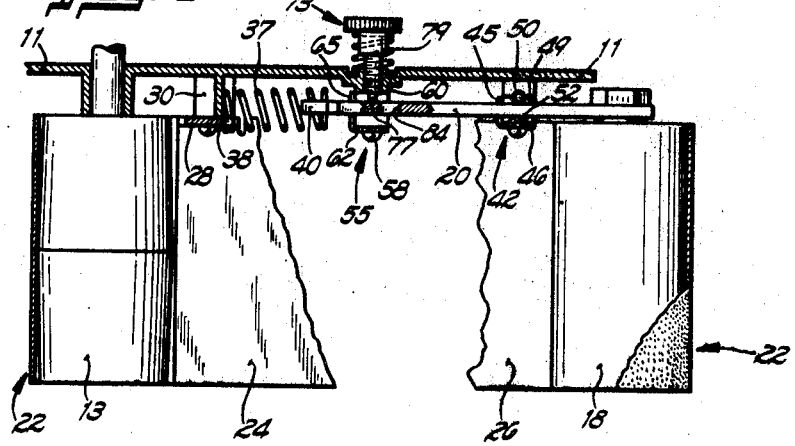
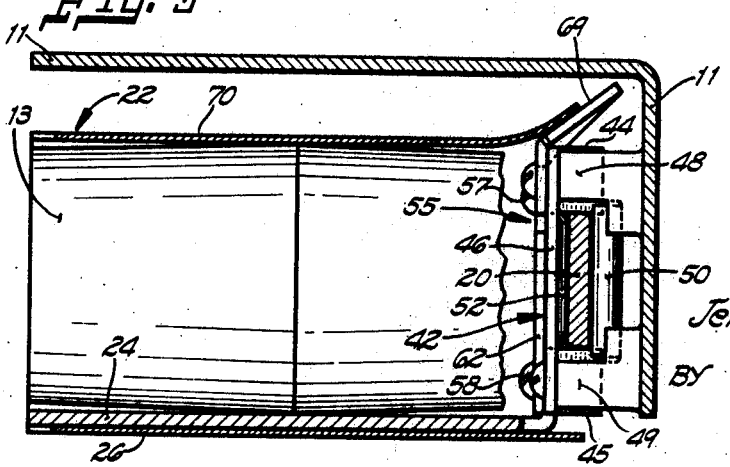
INVENTOR.
Jerome Buschman
BY Charles F Lind
Attorney Feb. 24, 1970        J. BUSCHMAN        3,497,336
BELT SANDER
Filed Nov. 1, 1967        2 Sheets-Sheet 2
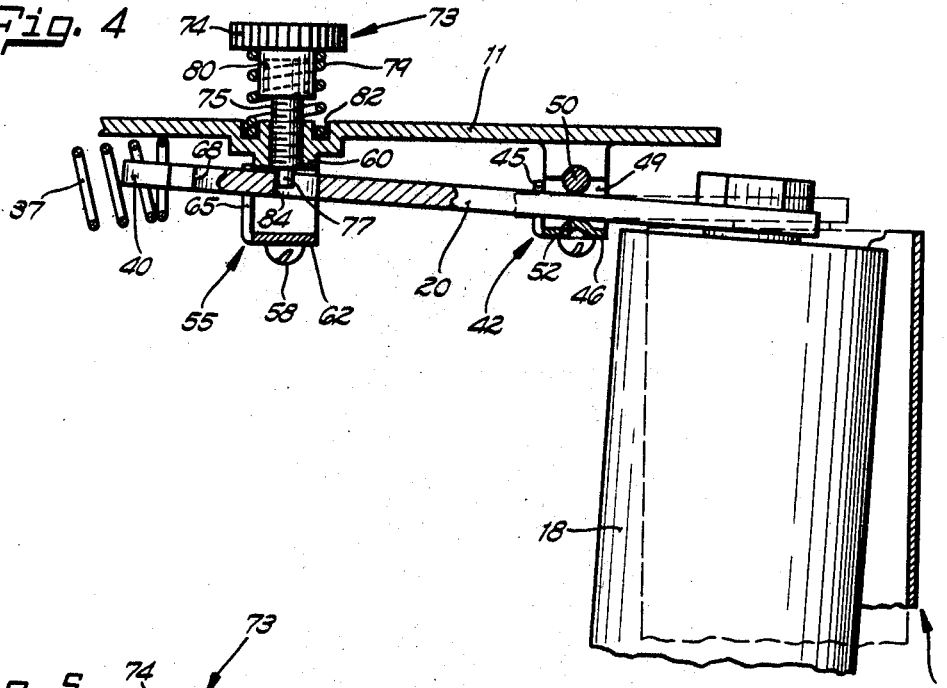
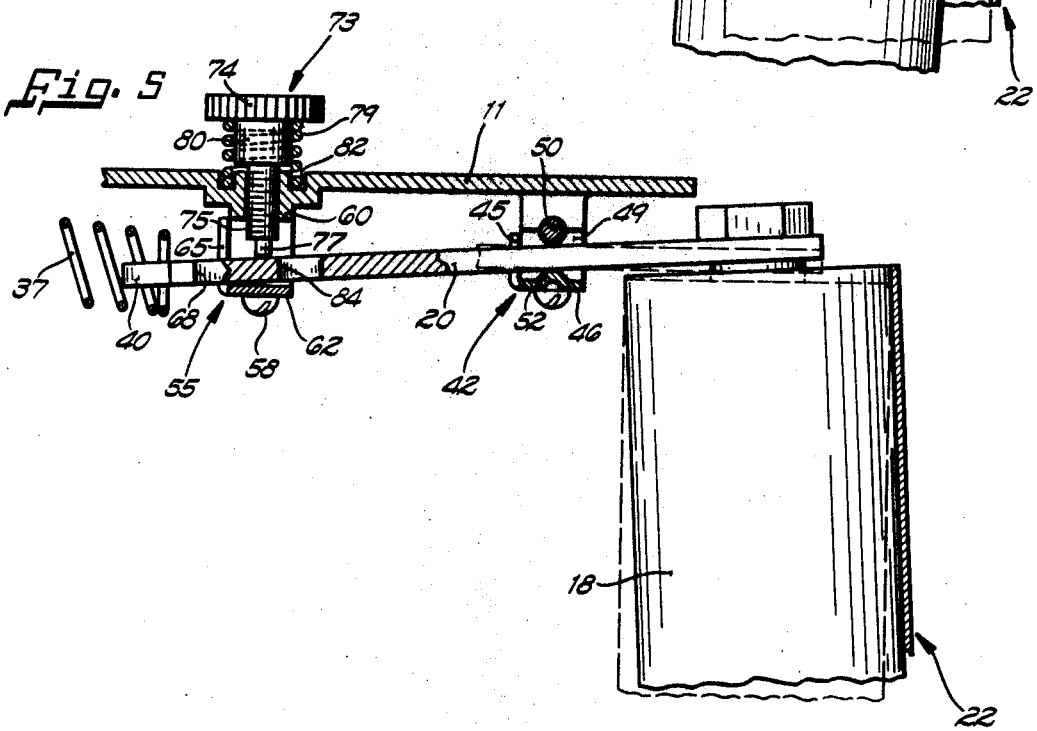
INVENTOR.
Jerome Buschman
BY Charles F Lind
Attorney United States Patent Office 3,497,336
Patented Feb. 24, 1970

3,497,336
BELT SANDER
Jerome Buschman, Jefferson City, Mo., assignor to McGraw-Edison Company, Elgin, Ill., a corporation of Delaware
Filed Nov. 1, 1967, Ser. No. 679,702
Int. Cl. B24b 23/06
U.S. Cl. 51—170                            1 Claim

ABSTRACT OF THE DISCLOSURE

A belt sander having simplified belt tensioning, tracking and guiding means that maintains the abrasive surface of the belt away from the housing by automatically restraining belt travel toward the housing and that indicate visually the need for pulley alignment.

This invention relates to a portable belt sanding machine having improved belt tensioning, tracking and guiding means.

Belt sanders commonly utilize belt tensioning structures usually disposed between the upper and lower passes of the belt and belt guiding means that adjusts the axis of the idler pulley to effect proper belt tracking. One problem in existing sanders is wear of or damage to the belt housing or other structure adjoining the marginal edge of the belt occasioned when the belt travels laterally too much and engages the adjoining structure. The common remedy of putting projections on the housing that engage the belt first if it travels toward the housing is inadequate, since any belt contact whatsoever, however infrequently and brief, rapidly wears the housing significantly.

The subject sanding device provides an idler pulley support which is free to move along a path, between the belt pulleys and is adjustable also by pivoting about an axis normal to both the pulleys and said path. A single spring acts on the idler pulley and maintains proper belt tension. A belt guide presents an inclined guide surface which engages the non-abrasive underside of the belt and thereby maintains the abrasive surface of the belt spaced from both the belt guide and any other structure of the tool. Moreover, as a misaligned belt travels over the inclined guide surface, visible indication is provided of the need to adjust the alignment.

Accordingly, an object of this invention is to provide an improved belt sander having a simplified belt tensioning and alignment structure.

It is a further object of this invention to provide a sander having drive and idler pulleys that can be aligned under operating conditions.

Another object of this invention is to provide a belt guide that affords visible indication that pulley alignment is proper, or might require adjustment.

It is also an object of this invention to provide a belt guide that contacts only the non-abrasive surface of the belt to preclude all contact of the abrasive belt surface with either the belt housing or the guide.

These and other objects of the invention will become apparent after reviewing the following description of a preferred embodiment of the invention as illustrated in the accompanying drawings.

FIG. 1 is a side elevation of a belt sander including a preferred embodiment of the present invention;

FIG. 2 is a partial section view, as seen generally from line 2—2 in FIG. 1 showing the adjusting structure of the subject sander;

FIG. 3 is a partial section, as seen generally from line 3—3 in FIG. 1; and

FIGS. 4 and 5 are partial section views, similar to FIG. 2, except showing alternate operative positions.

Referring to the drawings, FIG. 1 shows a portable belt sander having an integral frame 10 including a belt housing 11, a motor housing 15, and handle 16. A drive pulley 13 is journaled in the belt housing 11 and driven by a motor (not shown) mounted within the motor housing 15. An idler pulley 18 is rotatably mounted on a slide 20 which is biased by a spring to move away from the drive pulley 13 within the belt housing. A continuous belt 22 is trained over the drive pulley 13 and the idler pulley 18, and a sole plate 24 provides a platen over which the lower run 26 of the continuous belt passes to hold the belt against the work. The sole plate 24 is secured to the frame 10 by a rearward flange 28 bolted to frame embossment 30 and a forward flange 32 secured to the frame by bolts 34, and is cantilevered from these mounting in backup relation to the belt.

Belt 22 is tensioned by a compression spring 37 rearwardly abutting the embossment 30 and confined thereat by the embossment tab 38, and forwardly abutting the slide 20 and confined thereat by the slide projection 40. The slide 20 extends through the front and rear guides secured to the frame and is guided thereby to move laterally only within the belt housing. The front guide 42 includes a web 46 and inwardly turned flanges 44 and 45 that straddle the slide and overlie from embossments 48 and 49, and a fulcrum pin 50 supported between the embossments. Slide 20 is permitted to pivot horizontally about fulcrum pin 50 and a semicircular embossment 52 formed in guide plate web 46. The rear guide includes a plate member 55 secured to the embossments 48 and to upper and lower frame embossments by bolts 57 and 58. The slide 20 is confined transversely between frame projection 60 and web 62 of plate 55, and vertically between inwardly turned plate flanges 64 and 65. Longitudinal travel of the slide is limited by abutment of slide shoulders 67 or 68 with the upward inwardly extending flange 64 and underlying frame embossment. The upper portion 69 of plate 55 inclines upwardly at an acute angle away from the upper run 70 of belt 22 and extends both below and above this upper run.

A tracking adjustment and slide lock is provided at the side of the tool. A screw 73 having a knurled knob 74 for manual adjustment and a threaded shank 75 is received in a threaded tap of the frame projection 60 and has an end projection 77 engageable with the slide 20. A tracking adjustment spring 79 surrounds screw shank 80 and is confined at its opposite ends by knob 74 and the frame within annular recess 82. The thumb screw projection 77 is adapted to fit within aperture 84 on the slide.

Belt 22 is tensioned by spring 37 which urges the slide 20 and idler pulley 18 away from the drive pulley 13. Belt tension causes the slide 20 to have a turning moment about the fulcrum pin 50 and embossment 52 in a clockwise direction as viewed in FIG. 5. The slide 20 is prevented from turning about this pivot because of engagement with screw projection 77. The screw is advanced or retracted to provide parallel alignment between the idler and drive pulleys, or if the belt is imperfect, to establish such misalignment that the belt is tracked properly over the pulleys.

To change belts, the idler pulley is pressed rearwardly against the bias of spring 37 until slide aperture 84 is aligned with and fitted over screw projection 77. The turning moment about fulcrum pin 50 causes projection 77 to enter and remain within aperture 84, and the engaged slide 20 is thus retained in a retracted position shown in FIG. 4.

When pulley misalignment causes the belt to track toward the frame 10, the belt rides up guide surface 69 of plate 55 and is restrained against continued sideways travel, and visible indication is given that a tracking adjustment is required. Since guide surface 69 engages the non-abrasive lower surface of belt 22 only, damage to the belt housing by engagement with the abrasive edge of upper belt surface is prevented to extend the useful life of the structure.

While the invention has been described with reference to a preferred embodiment, it will be understood by those skilled in the art that various changes might be made therefrom without departing from the real inventive concept.

What is claimed is:

1. In a belt sander having a housing including a side wall, a drive pulley, means journalling said drive pulley to the housing side wall at the rear end thereof, an idler pulley, and adjustable support means journalling the idler pulley at the forward end of the housing side wall in properly spaced and canted relationship to the drive pulley to center run a sander belt trained over said pulleys, the combination of improved idler pulley support means including spaced front and rear guides carried by the side wall and a slide cradled by the guides for movement adjacent the side wall, means rotatably mounting said idler pulley in a cantilevered manner from the front inner face of the slide, said front and rear guides each including stationary surfaces engaging the top and bottom faces of the slide and the front guide further having stationary surfaces engaging the opposite side faces of the slide, operable together to restrain all movement of the idler pulley except in a direction toward and away from the drive pulley, said rear guide means further including spaced stationary inner and outer surfaces adapted to be engaged by the inner and outer side faces of the slide plate to limit possible canting of said idler pulley on opposite sides of parallelism with the drive pulley, a bolt threadably secured within the housing side wall and presenting a free end movable beyond the rear guide outer surface to engage the outer face of the slide operable to adjust the relative cant of the pulleys for proper belt tracking, seat means on the housing spaced rearwardly and generally symetrically of the slide, a compression spring confined between the seat means and the rear end of the slide operable to bias the idler pulley forwardly away from the drive pulley to tension the belt, engageable stop means between the slide and housing for limiting separation of the drive and idler pulleys even with no belt over the pulleys, and the slide having a restraining surface inwardly spaced from its outer side face open to the bolt and facing the idler pulley operable when the idler pulley is retracted toward the drive pulley to receive and retain the bolt effective to cant the idler pulley slightly toward the drive pulley and to hold the pulleys in this retracted and canted manner sufficient to remove or replace the belt from the pulleys.

References Cited

UNITED STATES PATENTS

| | | | |
|---|---|---|---|
| 3,417,511 | 12/1968 | Dudek | 51—170.4 |
| 3,176,436 | 4/1965 | Anton | 51—170.4 |

FOREIGN PATENTS

| | | |
|---|---|---|
| 945,719 | 12/1948 | France. |
| 602,436 | 9/1934 | Germany. |

JAMES L. JONES, JR., Primary Examiner